United States Patent
Chen et al.

(10) Patent No.: US 9,688,351 B2
(45) Date of Patent: Jun. 27, 2017

(54) TORQUE SENSOR AND ELECTRIC BICYCLE USING SAME

(71) Applicant: ScienBiziP Consulting (Shen Zhen) Co., Ltd., Shenzhen (CN)

(72) Inventors: Yen-Chi Chen, New Taipei (TW); Chang-Yuan Shih, New Taipei (TW); Shih-Hsin Hsu, New Taipei (TW)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 15 days.

(21) Appl. No.: 14/824,974

(22) Filed: Aug. 12, 2015

(65) Prior Publication Data

US 2016/0280323 A1    Sep. 29, 2016

(51) Int. Cl.
| | |
|---|---|
| B62M 6/50 | (2010.01) |
| B62M 6/65 | (2010.01) |
| B60L 15/20 | (2006.01) |
| G01L 3/14 | (2006.01) |

(52) U.S. Cl.
CPC ............... *B62M 6/50* (2013.01); *B60L 15/20* (2013.01); *B60L 15/2054* (2013.01); *B62M 6/65* (2013.01); *G01L 3/1464* (2013.01); *B60L 2200/12* (2013.01); *B60L 2220/44* (2013.01); *B60L 2240/423* (2013.01); *B60L 2250/26* (2013.01); *Y02T 10/7275* (2013.01)

(58) Field of Classification Search
CPC . B62M 6/50; B62M 6/65; B60L 15/20; G01L 3/1464; G01L 3/1435
See application file for complete search history.

(56) References Cited

U.S. PATENT DOCUMENTS

| | | | | |
|---|---|---|---|---|
| 8,646,560 | B2* | 2/2014 | Chan | B62M 6/50 180/206.3 |
| 9,354,129 | B2* | 5/2016 | Boudet | G01L 3/1478 |
| 2003/0038625 | A1 | 2/2003 | Guderzo | |
| 2014/0074348 | A1 | 3/2014 | Kitamura et al. | |
| 2016/0107720 | A1* | 4/2016 | Xu | B62M 6/50 475/4 |

FOREIGN PATENT DOCUMENTS

| | | |
|---|---|---|
| CN | 1399121 A | 2/2003 |
| CN | 203581299 U | 5/2014 |
| TW | M463208 U | 10/2013 |
| TW | 201410531 A | 3/2014 |

* cited by examiner

*Primary Examiner* — Todd Melton
(74) *Attorney, Agent, or Firm* — Steven Reiss

(57) ABSTRACT

A torque sensor for electrically assisting a vehicle with pedals includes a housing, a first gear, an actuator, and a control circuit. The housing defines a receiving chamber and is configured to be coupled to a drive member. The first gear is rotatably mounted in the receiving chamber. The actuator is received in the receiving chamber and is driven by the first gear. The control circuit including a resistor is received in the receiving chamber and the actuator slides along the resistor as a rider applies force to the pedals, thus for adjusting a resistance value of the control circuit, to allow the control circuit to output a signal which governs the assisting power. The disclosure also includes an electric bicycle using the torque sensor.

14 Claims, 8 Drawing Sheets

US 9,688,351 B2

TORQUE SENSOR AND ELECTRIC BICYCLE USING SAME

FIELD

The subject matter herein generally relates to control assistance of electrical power.

BACKGROUND

A motor is used in a vehicle, such as a bicycle, to augment the manual power applied to the pedal. These types of vehicles generally use a torque sensor to sense an amount of pedal input force being applied by a vehicle rider or operator. Then, an assisting motor is provided which adds to the manual force in a ratio based upon the amount of pedal force applied.

BRIEF DESCRIPTION OF THE DRAWINGS

Implementations of the present technology will now be described, by way of example only, with reference to the attached figures.

DETAILED DESCRIPTION

Figure 1:
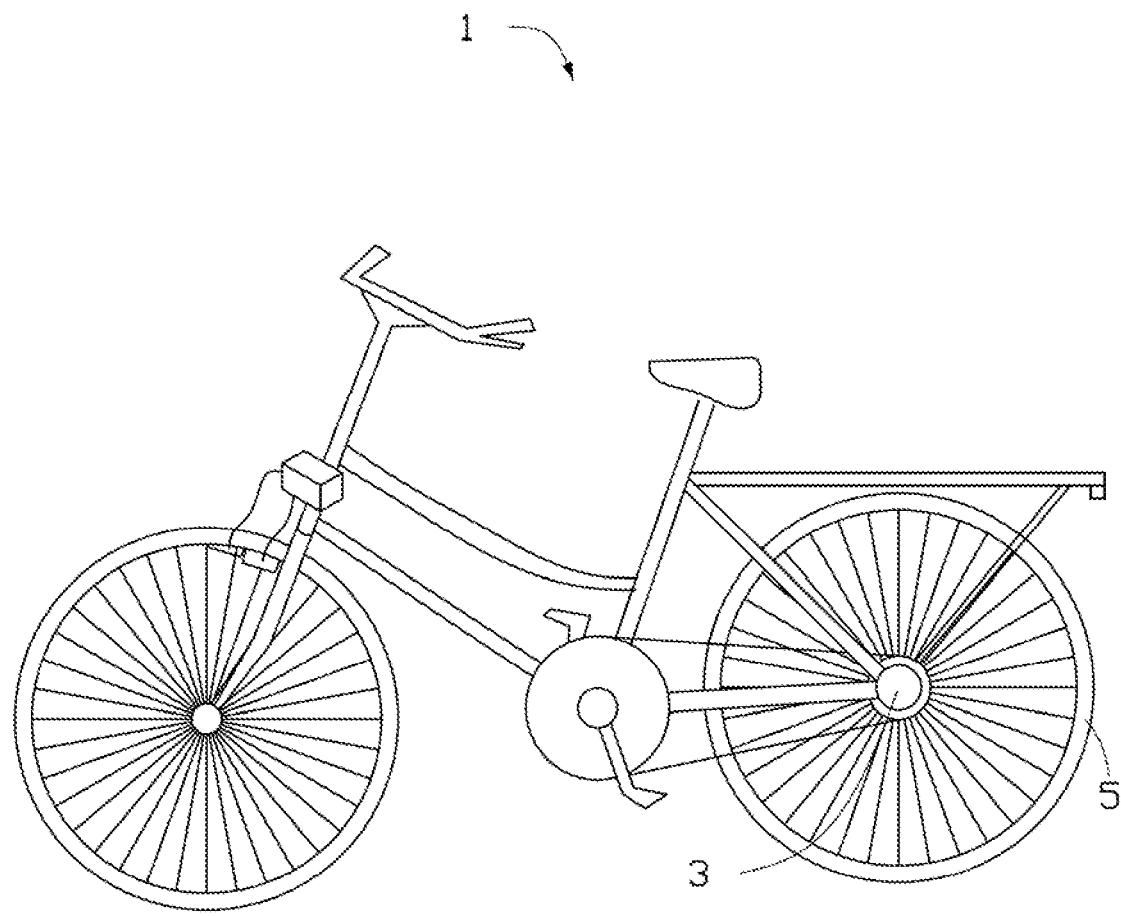
FIG. 1 is a diagrammatic view of an embodiment of an electric bicycle.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a torque sensor. The torque sensor can include a housing, a first gear, an actuator, and a control circuit. The housing can define a receiving chamber and be configured to be coupled to a drive member. The first gear can be rotatably mounted in the receiving chamber. The actuator can be received in the receiving chamber and can be driven by the first gear. The control circuit having a resistor can be received in the receiving chamber and can be in slidable contact with the actuator. The actuator is slid by the first gear along the resistor, thus adjusting a resistance value of the control circuit. The first gear is capable of being rotated under an external force, thereby enabling the control circuit to generate a signal for controlling a torque output of the drive member.

The present disclosure is further described in relation to an electric bicycle and can include a flywheel, a rear wheel, a drive member and a torque sensor. The drive member can be mounted in a central hole of the rear wheel. The torque sensor can be coupled between the drive member and the flywheel. The torque sensor can include a housing, a first gear, an actuator and a control circuit. The housing can define a receiving chamber and be coupled to the drive member. The first gear can be rotatably mounted in the receiving chamber and be coupled to the flywheel. The actuator can be received in the receiving chamber and be driven by the first gear. The control circuit can include a resistor. The resistor can be received in the receiving chamber and be slidably in contact with the actuator. The actuator is made to slide by the first gear along the resistor, thus adjusting a resistance value of the control circuit. The first gear is capable of being rotated by the flywheel, thereby enabling the control circuit to generate a signal for controlling a torque output of the drive member.

Figure 2:
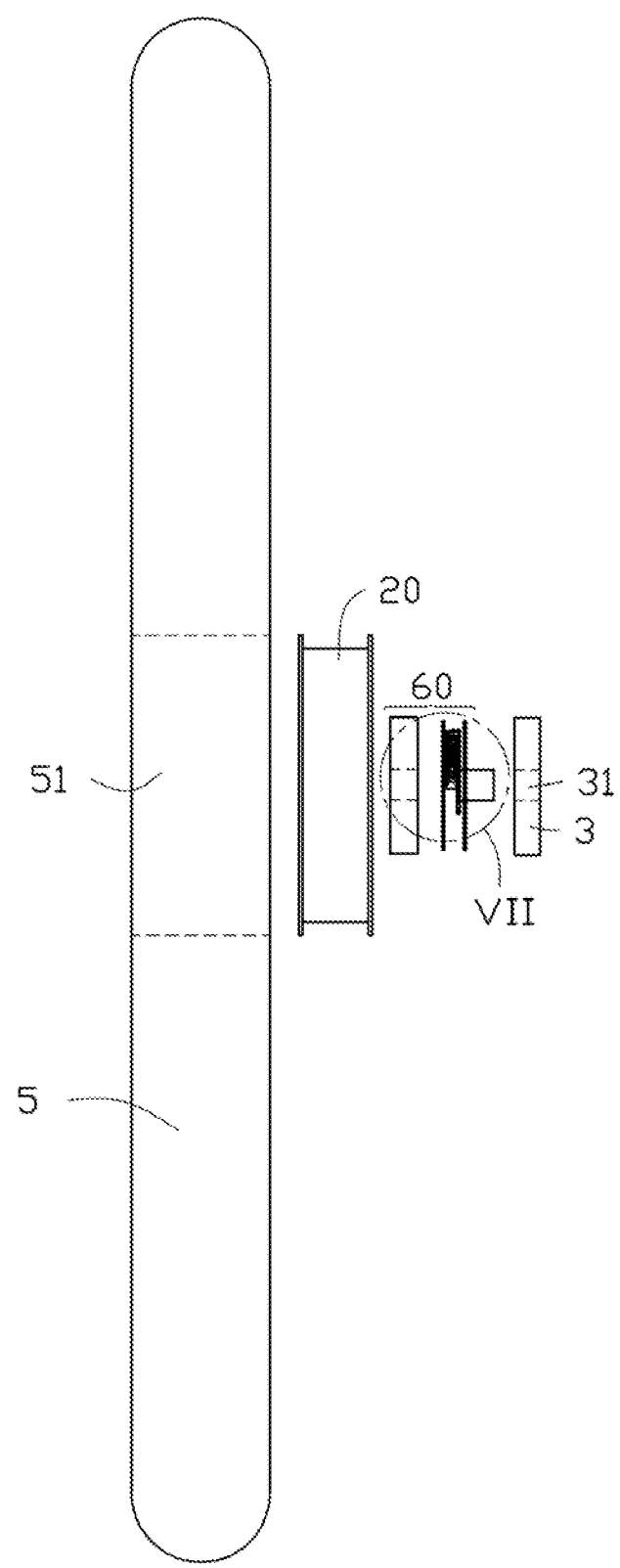
FIG. 2 is a partial exploded, diagrammatic view of the electric bicycle of FIG. 1, including a flywheel, a rear wheel, a drive member, and a torque sensor.

FIGS. 1-2 illustrate an electric bicycle 1 which can include a flywheel 3, a rear wheel 5, a drive member 20 and a torque sensor 60. A central hole 31 is defined at a central point of the flywheel 3. A larger central hole 51 is defined at a central point of the rear wheel 5. The drive member 20 can be mounted in the central hole 51 of the rear wheel 5. The torque sensor 60 can be coupled between the flywheel 3 and the drive member 20. The flywheel 3 can rotate the rear wheel 5 via the torque sensor 60, thereby enabling the torque sensor 60 to detect an amount of torque transmitted by the flywheel 3. Then the drive member 20 can output an assisting power based on the amount of the torque detected by the torque sensor 60. Other components and configurations of the electric bicycle 1, such as, a front wheel, a pedal, a crank, are not described here.

Figure 3:
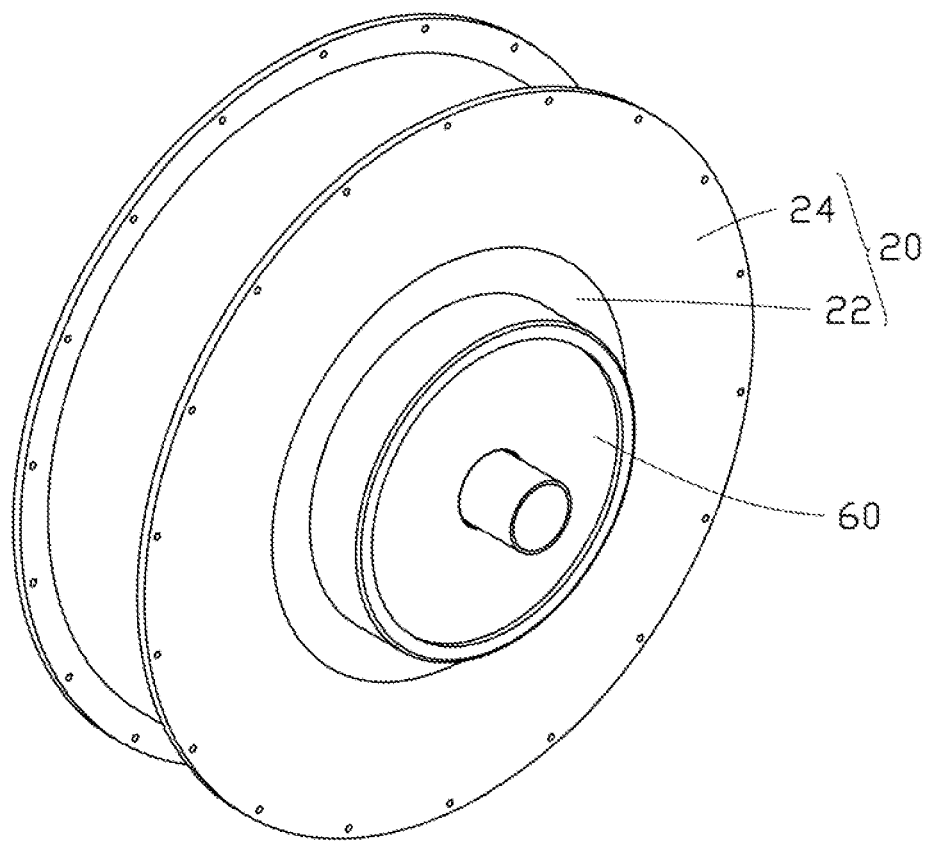
FIG. 3 is an isometric view of a drive member and a torque sensor of FIG. 2.

FIG. 3 illustrates that the drive member 20 can include an inner stator 22 and an outer rotor 24. The outer rotor 24 can be sleeved on the inner stator 22. The outer rotor 24 is capable of rotating relative to the inner stator 22. The outer rotor 24 can be received and secured in the central hole 51 of the rear wheel 5 (shown in FIG. 2).

Figure 4:
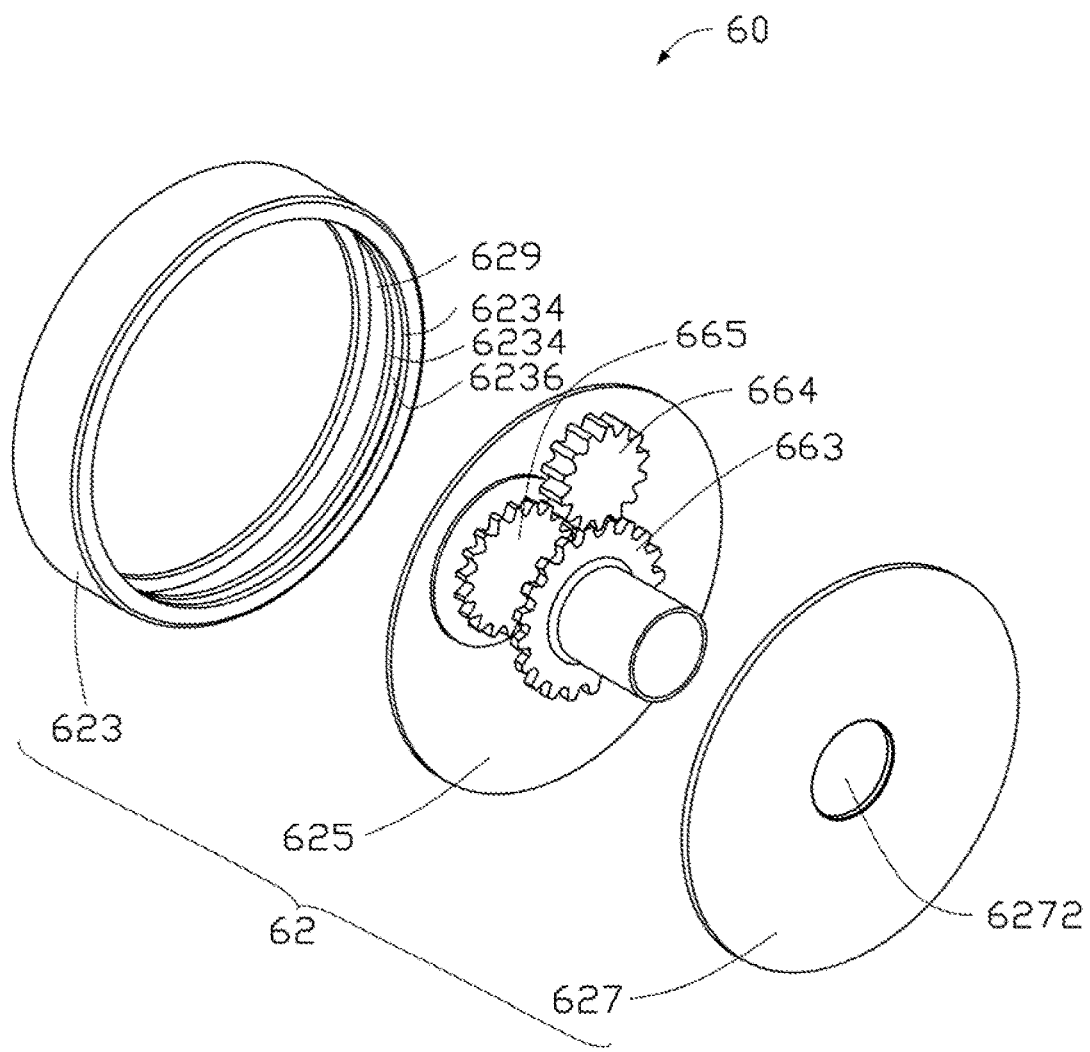
FIG. 4 is a partial, exploded view of the torque sensor of FIG. 3.
Figure 5:
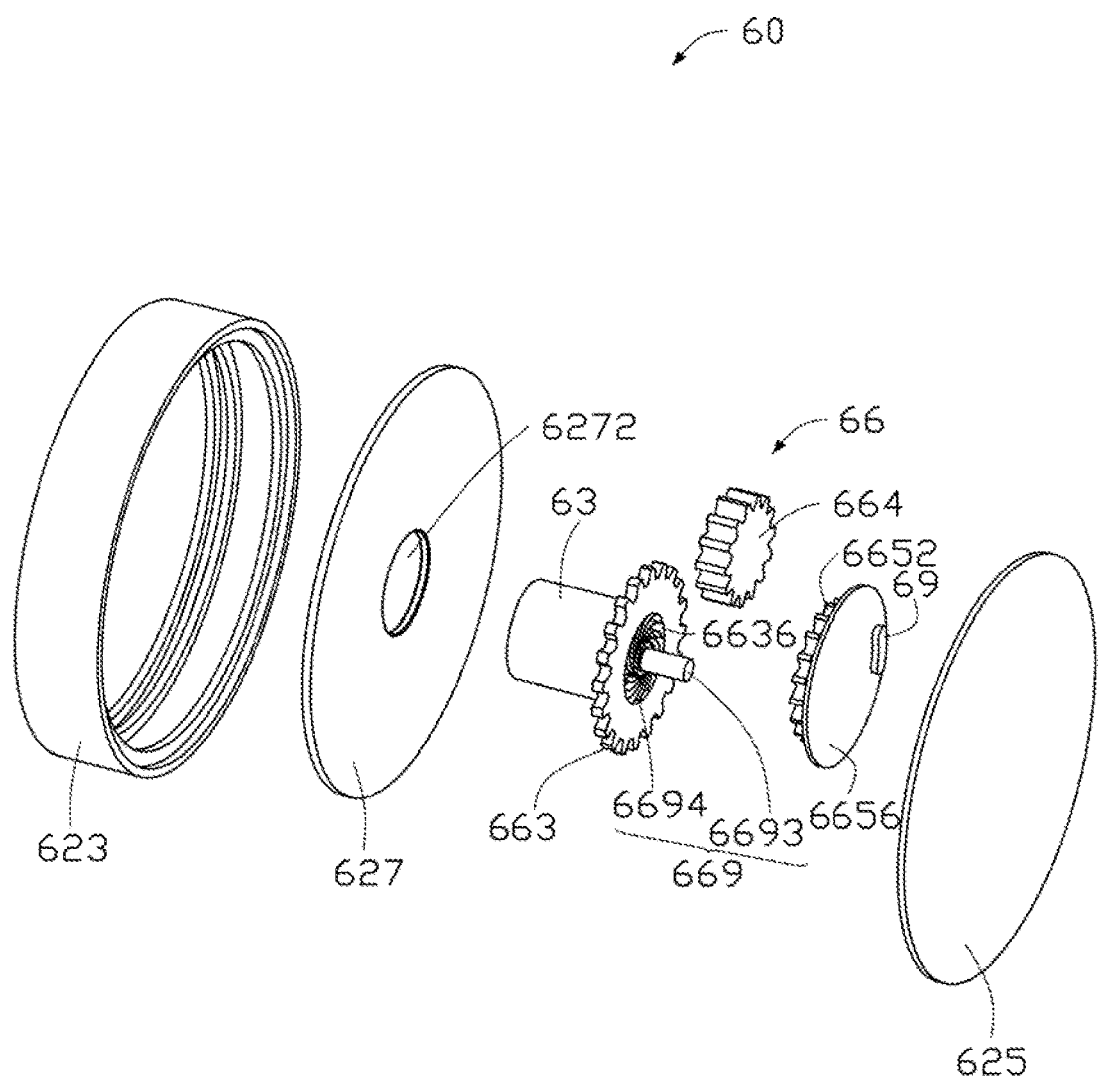
FIG. 5 is an exploded view of the torque sensor of FIG. 3.
Figure 6:
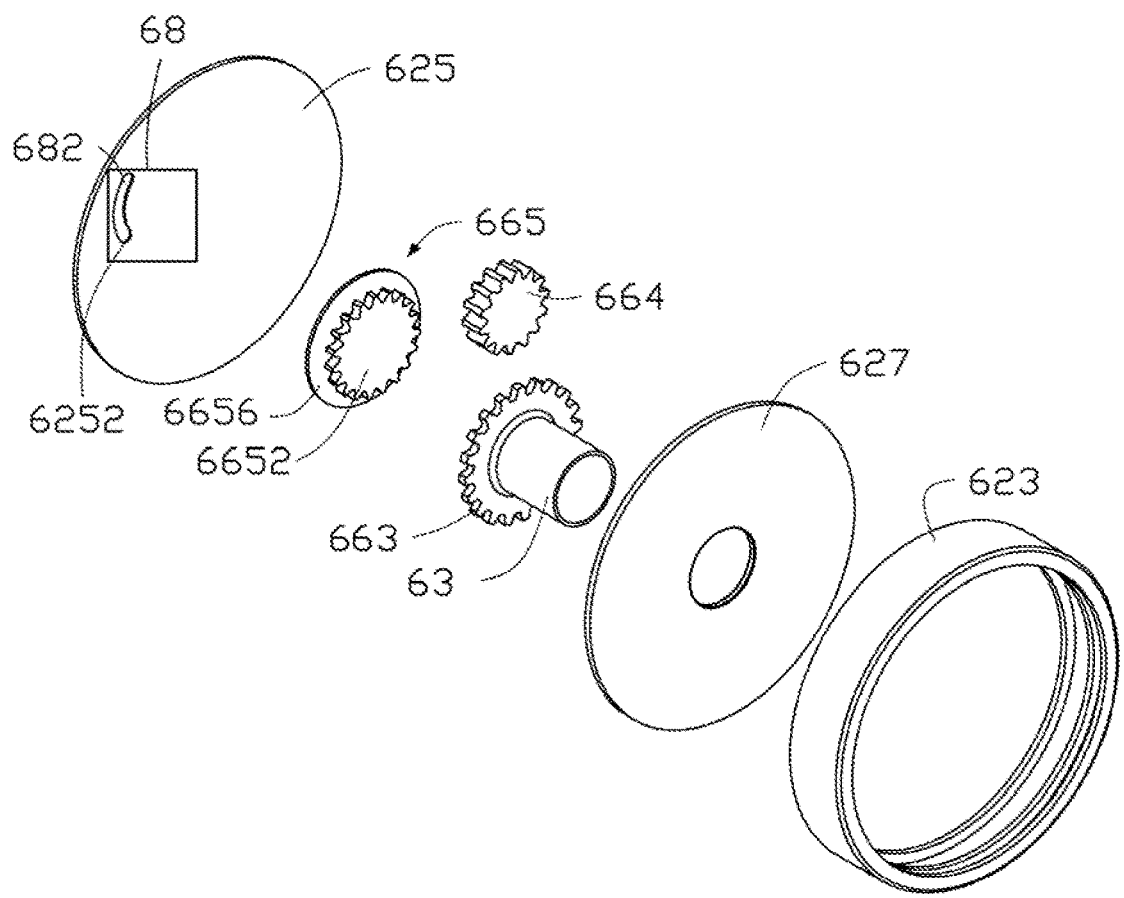
FIG. 6 is an exploded view of the torque sensor of FIG. 5 from another angle.

FIG. 2 illustrates that the torque sensor 60 can be coaxially mounted on an end surface of the inner stator 22 facing the flywheel 3. FIGS. 4-6 illustrate that the torque sensor 60 can include a housing 62, a connecting member 63, a gear assembly 66, a control circuit 68 and an actuator 69. The housing 62 can be mounted on the inner stator 22 and define a receiving chamber 629. The connecting member 63 can pass through the housing 62 to be fixed in the central hole 31 of the flywheel 3. The gear assembly 66 can be rotatably mounted in the receiving chamber 629 and securely coupled to the connecting member 63. The actuator 69 can be mounted in the receiving chamber 629 and coupled to the gear assembly 66. The control circuit 68 can be mounted in the receiving chamber 629 adjacent to the actuator 69.

FIG. 4 illustrates that the housing 62 can be a substantially hollow cylinder, which can include a coupling portion 623, a bottom plate 625 and a top plate 627. The bottom plate 625 and the top plate 627 can be respectively mounted on opposite ends of the coupling portion 623. The top plate 627 can be positioned adjacent to the flywheel 3, and the bottom plate 625 can be coaxially coupled to the inner stator 22. The receiving chamber 629 can be cooperatively defined by the coupling portion 623, the bottom plate 625, and the top plate 627. In the illustrated embodiment, each end portion of the coupling portion 623 can include two projections 6234 protruding around from an inner surface of the coupling portion 623. A mounting groove 6236 can be cooperatively defined between the two projections 6234. Peripheries of the bottom plate 625 and the top plate 627 can be rotatably received in the mounting groove 6236. The center of the top plate 627 can define a through inserting hole 6272. The connecting member 63 can pass through the inserting hole 6272 to be fixed to the flywheel 3.

FIGS. 4-5 illustrate that the gear assembly 66 can include a first gear 663, a second gear 664, a third gear 665 and a resetting member 669. The third gear 665 can be engaged with the second gear 664. The second gear 664 can be engaged with the first gear 663. The resetting member 669 can be mounted on the bottom plate 625 and coupled to the first gear 663.

The first gear 663 can be coupled to an end of the connecting member 63 away from the flywheel 3. The first gear 663 is capable of rotating with the connecting member 63 and the flywheel 3. The first gear 663 can define a through hole 6636.

The second gear 664 can be engaged with the first gear 663. The third gear 665 and the first gear 663 can be positioned at the same side of the second gear 664, thus the third gear 665 and the first gear 663 can rotate in the same direction. The second gear 664 and the third gear 665 can have a smaller diameter than the first gear 663, such that the third gear 665 is capable of rotating through a larger angle than that of the first gear 663.

Figure 7:
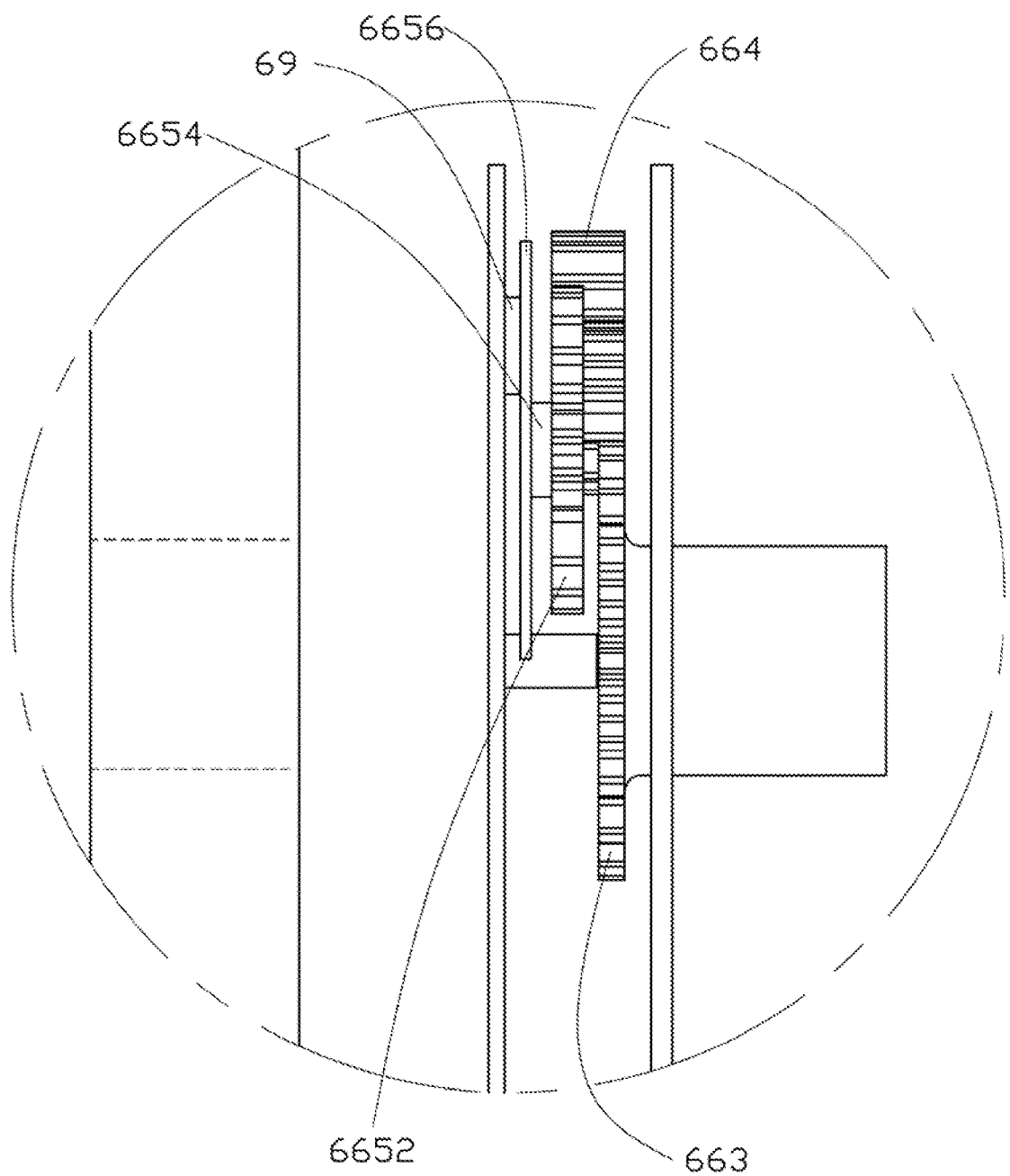
FIG. 7 is an enlarged view of a circle portion VII of FIG. 2.

FIG. 7 illustrates that the third gear 665 can include a gear portion 6652, a transferring rod 6654 and a turntable 6656. The gear portion 6652 can be coupled to an end of the transferring rod 6654 adjacent to the top plate 627. The turntable 6656 can be coupled to the other end of the transferring rod 6654 adjacent to the bottom plate 625. The turntable 6656 and the gear portion 6652 can be rotated in the same direction.

FIG. 5 illustrates that the resetting member 669 can include a mounting rod 6693 and a plurality of elastic sheets 6694. The mounting rod 6693 can be mounted on a substantially central portion of the bottom plate 625 and extend into the through hole 6636. The plurality of elastic sheets 6694 can be staggered and separately received in the through hole 6636. One end of each elastic sheet 6694 can be mounted on the mounting rod 6693. The other end of each elastic sheet 6694 can be mounted on an inner surface of the through hole 6636. In other embodiments, the plurality of elastic sheets 6694 can be replaced by a power spring. One end of the power spring can be fixed to the mounting rod 6693. The other end of the power spring can be coupled to the inner surface of the through hole 6636.

FIG. 6 illustrates the control circuit 68 can be mounted on the bottom plate 625. The control circuit 68 can include a resistor 682. The resistor 682 can be positioned adjacent to the turntable 6656. In the illustrated embodiment, an inner surface of the bottom plate 625 can define a sliding groove 6252. The resistor 80 can be mounted in the sliding groove 6252. Other components and configurations of the control circuit 68, such as a capacitance, are not described here. FIG. 5 also illustrates the actuator 69 can be mounted on a surface of the turntable 6656 facing the sliding groove 6252. The actuator 69 is capable of sliding along the resistor 682 in the sliding groove 6252.

In assembly, the bottom plate 24 can be mounted on the drive member 20. The connecting member 63 can be inserted into the central hole 31 of the flywheel 3.

When a rider is pedaling, the connecting member 63, the first gear 663, the second gear 664 and the third gear 665 can be rotated a certain angle. The actuator 69 is allowable to slide a certain distance along the resistor 682, thus a resistance value of the control circuit 68 can be adjusted, to allow the control circuit 68 to output a calibrated signal. The drive member 20 can output a certain power according to the signal to assist the pedaling rider. The elastic sheets 6694 can be deformed at the same time. When the flywheel 3 is not being rotated, the deformed elastic sheets 6694 can reset the actuator 69, the third gear 665, the second gear 664 and the first gear 663, and then the drive member 20 does not output any assisting power.

Figure 8:
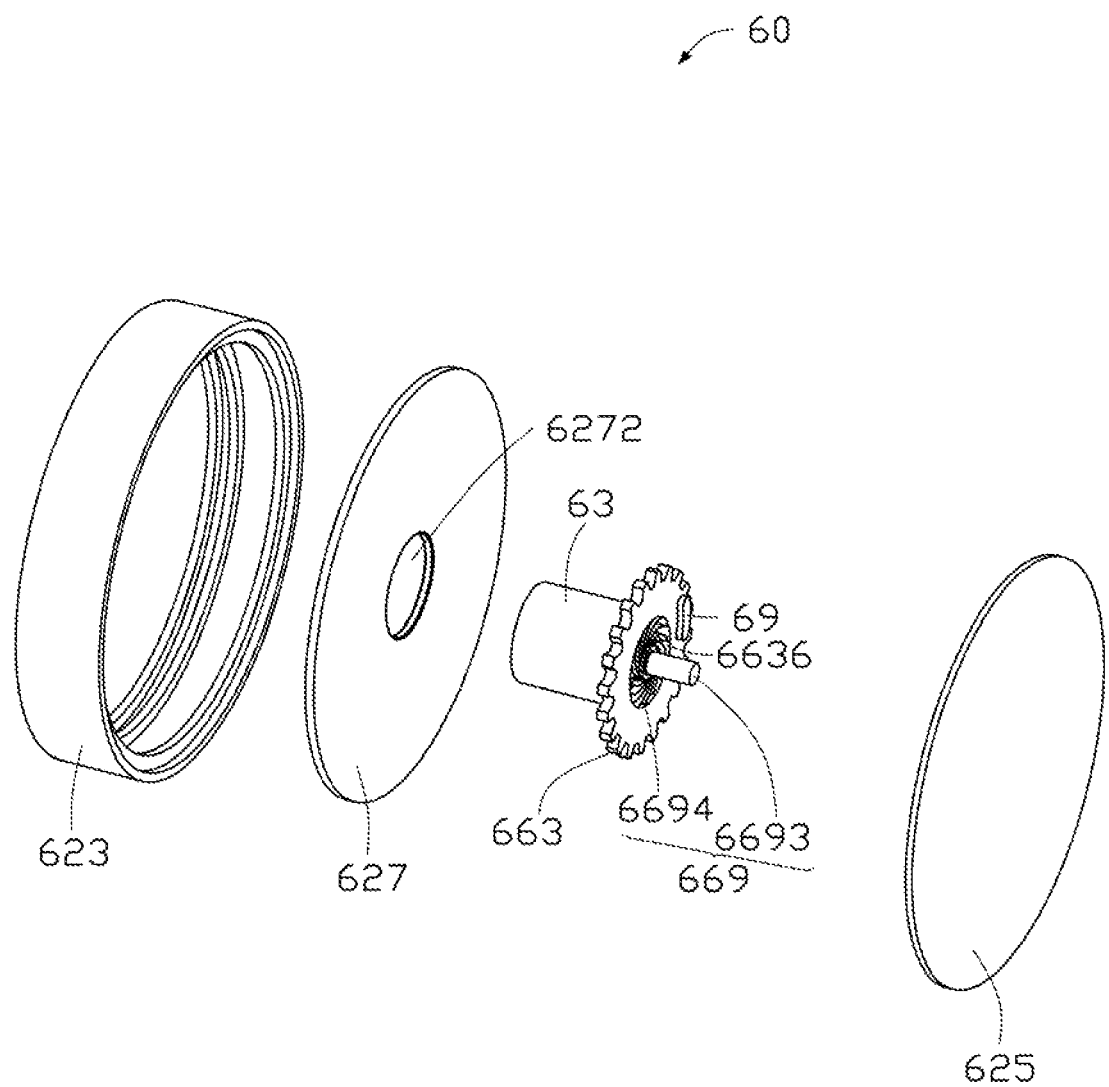
FIG. 8 is an exploded view of a torque sensor with another embodiment of this disclosure.

In other embodiments, the torque sensor 60 can be applied to any type of vehicle that is manually powered but which can benefit from an assisting power. When the actuator 69 is mounted on the first gear 663, the second gear 664 and the third gear 665 can be omitted (shown in FIG. 8). The gear assembly 66 can include two or more than three gears. The control circuit 68 can be mounted on the coupling portion 623 or the top plate 627.

The embodiments shown and described above are only examples. Many details are often found in the art such as the other features of a torque sensor and an electric bicycle using the torque sensor. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A torque sensor comprising:
   a housing having a receiving chamber, the housing configured to be coupled to a drive member;
   a first gear rotatably mounted in the receiving chamber;
   an actuator received in the receiving chamber and driven by the first gear; and
   a control circuit comprising a resistor, the resistor received in the receiving chamber and be in slidable contact with the actuator;
   wherein the actuator is made to slide by the first gear along the resistor for adjusting a resistance value of the control circuit, the first gear is capable of being rotated under an external force, thereby enabling the control circuit to generate a signal for controlling a torque output of the drive member;

wherein a through hole is defined in the first gear, the torque sensor further comprises a resetting member, the resetting member comprises a mounting rod and a plurality of elastic sheets, the mounting rod is mounted on an inner surface of the housing and extends into the through hole, the plurality of elastic sheets are crookedly and separately received in the through hole, one end of each elastic sheet is mounted on an end of the mounting rod, the other end of each elastic sheet is mounted on an inner surface of the through hole.

2. The torque sensor of claim 1, wherein the torque sensor further comprises a second gear and a third gear, the second gear and the third gear are received in the receiving chamber, the third gear is engaged with the second gear, the second gear is engaged with the first gear, the second gear and the third gear have a smaller diameter than the first gear, and the actuator is mounted on the third gear facing the resistor.

3. The torque sensor of claim 2, wherein the torque sensor further comprises a connecting member configured to be rotated under the external force, the connecting member passes through the housing, and the first gear is positioned on an end of the connecting member.

4. The torque sensor of claim 2, wherein the third gear comprises a gear portion, a transferring rod and a turntable, the gear portion and the turntable are coupled to opposite ends of the transferring rod, the gear portion is engaged with the second gear, and the actuator is mounted on a surface of the turntable away from the gear portion.

5. The torque sensor of claim 1, wherein the housing comprises a coupling portion, a bottom plate, and a top plate; the bottom plate and the top plate are respectively mounted on opposite ends of the coupling portion, the receiving chamber is cooperatively defined by the coupling portion, the bottom plate and the top plate, the resistor is mounted on an inner surface of the bottom plate.

6. The torque sensor of claim 5, wherein each end of the coupling portion comprises two projections protruding around from an inner surface of the coupling portion, a mounting groove is defined between the two projections, peripheries of the bottom plate and the top plate are rotatably received in the mounting groove.

7. The torque sensor of claim 5, wherein a sliding groove is defined on the inner surface of the bottom plate, the resistor is mounted in the sliding groove.

8. An electric bicycle comprising:
a flywheel;
a rear wheel having a central hole;
a drive member mounted in the central hole of the rear wheel; and
a torque sensor comprising:
    a housing having a receiving chamber couple to the drive member;
    a first gear rotatably mounted in the receiving chamber and coupled to the flywheel;
    an actuator received in the receiving chamber and driven by the first gear;
    a control circuit comprising a resistor, the resistor received in the receiving chamber and be in slidable contact with the actuator;

wherein the actuator is made to slide by the first gear along the resistor for adjusting a resistance value of the control circuit, the first gear is capable of being rotated by the flywheel, thereby enabling the control circuit to generate a signal for controlling a torque output of the drive member;

wherein a through hole is defined in the first gear, the torque sensor further comprises a resetting member, the resetting member comprises a mounting rod and a plurality of elastic sheets, the mounting rod is mounted on an inner surface of the housing and extends into the through hole, the plurality of elastic sheets are staggered and separately received in the through hole, one end of each elastic sheet is mounted on an end of the mounting rod, the other end of each elastic sheet is mounted on an inner surface of the through hole.

9. The electric bicycle of claim 8, wherein the torque sensor further comprises a second gear and a third gear, the second gear and the third gear are received in the receiving chamber, the third gear is engaged with the second gear, the second gear is engaged with the first gear, the second gear and the third gear have a smaller diameter than the first gear, and the actuator is mounted on a surface of the third gear facing the resistor.

10. The electric bicycle of claim 9, wherein the torque sensor further comprises a connecting member coupled to the flywheel, the connecting member passes through the housing, and the first gear is positioned on an end of the connecting member.

11. The electric bicycle of claim 9, wherein the third gear comprises a gear portion, a transferring rod and a turntable, the gear portion and the turntable are coupled to two opposite ends of the transferring rod, the gear portion is engaged with the second gear, and the actuator is mounted on a surface of the turntable away from the gear portion.

12. The electric bicycle of claim 8, wherein the housing comprises a coupling portion, a bottom plate and a top plate, the bottom plate and the top plate are mounted on two opposite ends of the coupling portion, the receiving chamber is cooperatively defined by the coupling portion, the bottom plate and the top plate, the resistor is mounted on an inner surface of the bottom plate.

13. The electric bicycle of claim 12, wherein each end of the coupling portion comprises two projections protruding around from an inner surface of the coupling portion, a mounting groove is defined between the two projections, peripheries of the bottom plate and the top plate are rotatably received in the mounting groove.

14. The electric bicycle of claim 12, wherein a sliding groove is defined on the inner surface of the bottom plate, the resistor is mounted in the sliding groove.

* * * * *